Feb. 11, 1936.  W. D. GOVE ET AL  2,030,203
TORQUE LOADING LASH ADJUSTING DEVICE FOR FRICTION ROLLER TRANSMISSIONS
Filed May 31, 1934   2 Sheets-Sheet 1

Inventors
Winfield D. Gove
& John Dolza
By Blackmore, Spencer & Flint
Attorneys

Feb. 11, 1936.  W. D. GOVE ET AL  2,030,203
TORQUE LOADING LASH ADJUSTING DEVICE FOR FRICTION ROLLER TRANSMISSIONS
Filed May 31, 1934  2 Sheets-Sheet 2

Inventors
Winfield D. Gove
& John Dolza
By Blackmore, Spencer & Hurd
Attorneys

Patented Feb. 11, 1936

2,030,203

UNITED STATES PATENT OFFICE 2,030,203

TORQUE LOADING LASH ADJUSTING DEVICE FOR FRICTION ROLLER TRANSMISSIONS

Winfield D. Gove, Detroit, and John Dolza, Flint, Mich., assignors to General Motors Corporation, Detroit, Mich., a corporation of Delaware

REISSUED

Application May 31, 1934, Serial No. 728,264

6 Claims. (Cl. 74—200)

This invention relates to friction race-and-roller transmission mechanisms, and particularly to means for squeezing the rollers between the races with a force which varies with the torque transmitted. Means functioning to this end, in friction race-and-roller transmission mechanisms for motor vehicles, have been commonly referred to as torque loading devices and may conveniently consist of cams and interposed rolling bodies.

Troubles have been experienced, in automobile transmissions of the aforesaid type, equipped with torque loading devices, by looseness between the elements of the torque loading devices occurring as a result of wear,—deformation of transmission elements, or variations of axial distance between race surfaces however caused. If looseness occurs in the torque loading devices there results, obviously, a looseness in the driving train between engine and vehicle wheels, a loss of axial pressure of races on rollers, and possible failure to transmit the torque required.

It is an object of this invention to take up automatically any looseness occurring in the torque loading devices of a race and roller transmission mechanism whatever the cause.

Said object is achieved by means of an adjustable gag arranged to "back up" one cam or equivalent element of the torque loading device, in combination with a spring exerting a constant elastic force on the gag in a direction to move it so as to take up any slack that may occur in the torque loading elements. This adjustment occurs, of course, only at those periods when no torque is being transmitted by the torque loading devices.

In the accompanying drawings in which like parts are indicated by like reference characters:

Figure 1:
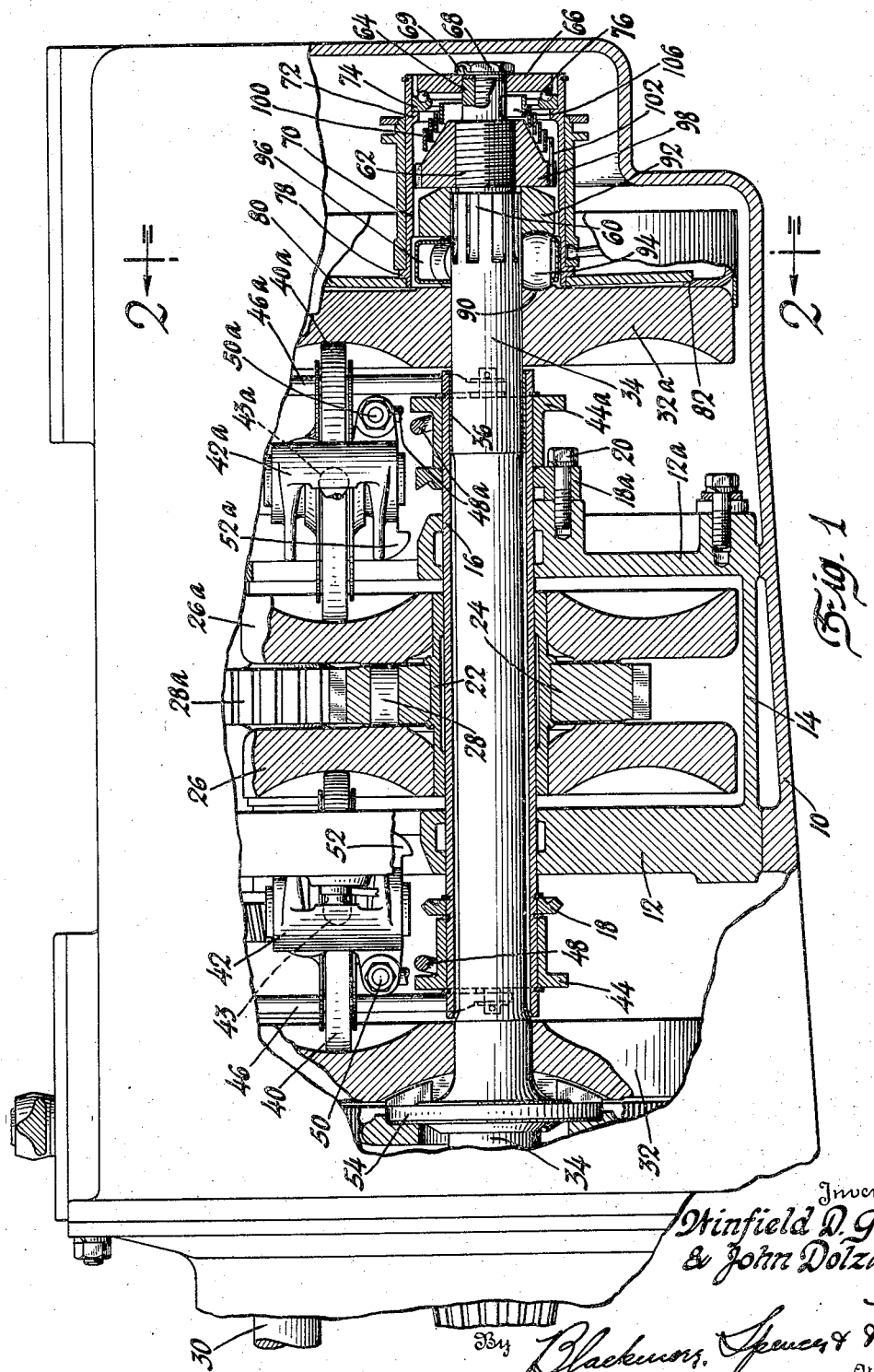
Fig. 1 is a side elevation of a transmission casing broken away in part and disclosing in longitudinal section, parts of an exemplary toroidal race-and-roller transmission mechanism associated with a torque loading device embodying this invention.
Figure 2:
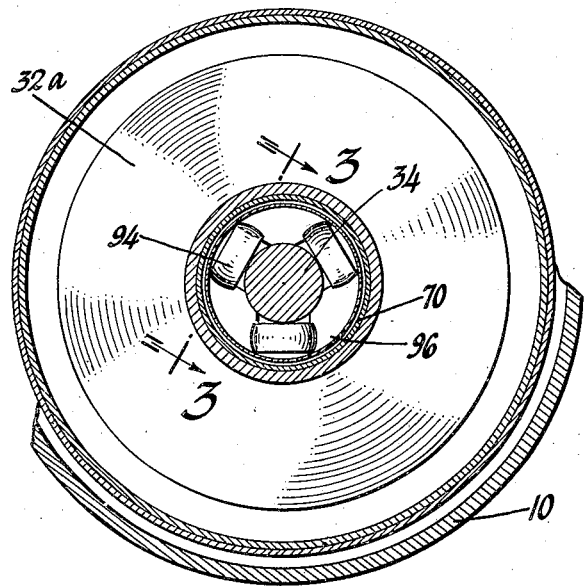
Fig. 2 is a transverse section through the torque loading rollers taken on a plane indicated by line 2—2, Fig. 1.

In Fig. 1 there is shown one form of race-and-roller transmission mechanism associated with means embodying this invention, for axially pressing the races toward one another and squeezing the rollers between them. The transmission mechanism illustrated is of the duplex race and roller type consisting of two sets of coaxial toroidal races and corresponding sets of interposed rollers whereby the power communicated to the driving races by the input shaft is transmitted in parallel by the two sets of rollers and two driven races to the output shaft.

Referring to the details of construction illustrated in Fig. 1, numeral 10 indicates a transmission casing. A supporting and strengthening structure, comprising parallel members 12 and 12a joined by a parti-cylindrical web 14, is fitted within and pinned to the casing 10. This structure may consist of an integral casting. Members 12 and 12a have alined central holes in which a frame tube 16 is snugly fitted. A collar 18a, welded or otherwise bonded to tube 16 is secured also as by bolts 20 to member 12a. Collar 18a serves also as a stop cooperating with stops on the roller carriers of one set to limit tilting of the rollers to low ratio position. A collar 18 serves also as a stop to similarly limit the tilting of the rollers of the other set. Members 12 and 12a also have a plurality of equally spaced openings to accommodate the several intermediate rollers of each set.

A hub-like tubular member 22 is rotatably mounted on frame tube 16 between members 12 and 12a. Gear 24 is secured centrally to member 22 and driving races 26, 26a, are sleeved over the end portions of member 22 that protrude from gear 24, and are free to rotate thereon. A number of rollers, one of which is shown at 28 (Fig. 1) seated in slots through gear 24, and capable of rotating about radial axes, have their peripheries in contact with the backs of toroidal driving races 26, 26a. Rollers 28 constitute differential driving means between gear 24 and races 26, 26a. Gear 24 meshes with a driving gear 28a adapted to be rotated by input shaft 30 driven by an engine (not shown).

Toroidal driven races 32 and 32a are in driving connection with output shaft 34, journaled in the front (the left in Fig. 1) of casing 10 and in the frame tube at 36. Power is delivered by the left hand end of this shaft protruding through the casing.

One set of rollers 40 is disposed between two races 26 and 32 and a second set 40a between races 26a and 32a. The rollers are rotatably mounted in carriers 42 and 42a which are moored at one end by universal joints 43, 43a, to the supporting members 12 and 12a.

Control means effective on the carriers 42 and 42a, actuated by external influences, adjusts the rollers to desired different ratio positions. Portions of the control mechanism are shown in Fig. 1, in the angularly movable collars 44, 44a, adapted to be rocked by control links 46 and 46a, and in the links 48, 48a, the outer ends of which are universally pivoted to the carriers at 50 and 50a. Stops 52, 52a, on the carriers cooperate with the stop collars 18, and 18a to limit the tilt of rollers 40, 40a, toward low ratio position when output shaft 34 is rotated in reverse.

Driven race 32 is keyed to output shaft 34 and abutment 54. Driven race 32a is axially movable on shaft 34 and is capable of a limited rotation thereon as permitted by the torque loading devices bearing against its back, to be described. Driving races 26 and 26a are capable of some axial movement with respect to output shaft and the driven races. Carriers 42 and 42a, being attached to the frame members 12, 12a, only by universal joints at one end, the rollers being mounted at their free ends, permit, of course, slight movement of the roller centers should the races be moved closer together.

The construction thus far described is exemplary of a race and roller transmission mechanism to which the torque loading device of this invention is applicable. The transmission mechanism itself is not a part of the invention claimed herein.

Figure 4:
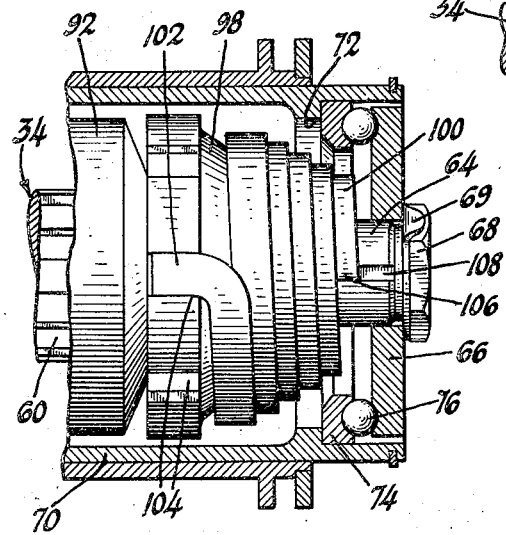
Fig. 4 is a view from beneath, partly in section, illustrating an automatic take-up device for maintaining the cooperating elements of the torque loading device in close contact.

The loading means, for squeezing the races and rollers together with the force necessary to enable them to transmit the torque required under varying loads is shown in section at the right of Fig. 1. In Fig. 1, output shaft 34 is shown grooved or splined at 60, slightly reduced and threaded at 62, at the right of the splined portion, and still further reduced at the cylindrical end portion 64. An adjustable abutment collar 66 (see also Fig. 4) is shown sleeved over the reduced end 64 of shaft 34. Reduced portion 64 is axially drilled and tapped to receive adjusting bolt 68, the large head of which bears against the rear of abutment 66. By screwing up the bolt the abutment may be moved toward race 32a. The bolt can be locked against accidental rotation by a bolt lock 69.

A sleeve 70 surrounds the torque loading elements and its rear end extends over adjustable abutment 66. An annular shoulder 72 within the sleeve 70 forms a seat for a bearing race 74, between which, and abutment 66, is a row of bearing balls 76. The other or forward end of sleeve 70 is provided with an external shoulder 78 bearing against the inner zone of an annular spring 80 of Belleville type (as shown in U. S. Patent 65,790) which exerts elastic pressure against the back of race 32a at the zone 82. It will, therefore, be seen that the races and rollers may be pressed together elastically by the action of spring 80, and that the degree of elastic loading may be varied by turning the bolt 68. The elastic load may be predetermined and is intended to be such as will enable the races and rollers to transmit adequate torque to take care of a given ordinary or light load. To take care of loads in excess of those for which the spring loading device is set, the so-called torque loading devices are provided.

Figure 3:
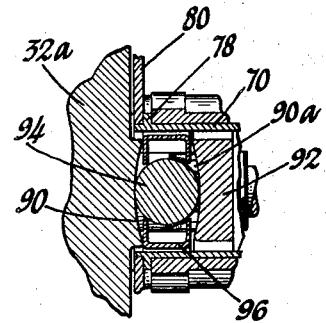
Fig. 3 is a fragmentary longitudinal section on a plane indicated by line 3—3 of Fig. 2.

The torque loading devices consist of cams 90 (Fig. 3) on the back of race 32a, opposing cams 90a on the front of member 92, which is slidable on the splined part 60 of shaft 34, rollers 94 interposed between the cams on race 32a and member 92, cage 96, for retaining rollers 94, adjustable abutment member or take-up gag, in the form of nut 98, threaded at 62 on shaft 34 and bearing against the rear of slidable member 92, and spiral automatic take-up spring 100. The nut 98 acts as a positive take-up of all slack or lost motion between member 92 of the torque loading assembly and the threads 62 on the shaft 34, said threads serving as abutment means which resists the reaction force of the torque loading means through the gag nut 98. Spring 100 has one bent end 102 (Fig. 4) seated in one of the axial grooves 104 in the perimeter of threaded nut 98, and the other end 106 turned toward the spring axis and inserted in a groove 108 in the reduced extremity 64 of shaft 34. Spring 100 may be biased or pretensioned any desired extent before seating the ends in both the prepared grooves. The nut 98 may be rotated until cams and rollers are in firm contact, with the rollers seated in the lowest parts or centers of the cam surfaces, and after that the spring having one end locked in groove 108 of shaft 34, may be placed under tension and its end 102 inserted in the appropriate groove 104 of the adjusting nut, so that its elastic force is exerted in a direction to screw up the nut in case any looseness thereafter should occur between the cams and rollers of the torque loading elements.

It will be apparent that the nut 98 biased by spring 100 in a direction to take up any slack between the cams and collars of the torque loading device, and restore to that device capacity to impart the greatest amplitude of axial movement for which it was designed, acts as a wedging gag between the threads at 62 on shaft 34 and the rear end of element 92.

Although a take-up or gag in the form of a nut 98 and a spiral biasing spring 100 are illustrated and described, it is understood that the desired result may be achieved by other forms of gags and biasing means within the spirit of this invention.

There is a measurable deflection evidenced in an axial direction in race and roller transmission mechanisms, due to the elastic deformation of races, rollers, and other elements when subjected to the axial force exerted by the loading means squeezing the rollers between the races. The extent of elastic deflections or yield in an axial direction of all of the elastic elements of a double toric transmission mechanism of the kind illustrated, varies with the variation of the ratio position or tilt of the rollers. It has been ascertained by tests that in a transmission like that illustrated, under a given axial pressure, the elastic yield or deflection in an axial direction when the rollers are tilted in low gear position (i. e. when output shaft runs at lowest speed with respect to the speed of input shaft) is 38% greater than when the rollers are tilted in high gear position, and that the least axial deflection occurs when the rollers are parallel with the race axis or in 1:1 ratio position. It will be understood, however, that the extent of elastic yield must vary with different designs, different proportions of races and rollers and different materials.

If means were not provided for compensating for the differences in elastic deformation occurring with different ratio positions of the rollers, it is apparent that, in the use of an automatic take-up torque loading device of this invention, the torque loading elements, if automatically adjusted to take up all slack when the transmission elements are in position of greatest axial elastic deflection, cannot back off, as it were, when the transmission elements are in position of least or lesser axial deflection, and therefore the transmission becomes loaded too heavily by the torque loading means. The conditions mentioned would occur if the curvature of the driving and driven raceways in an axial plane had the same center of curvature and the same radius of curvature, as is customary in toric race and roller transmission.

Figure 5:
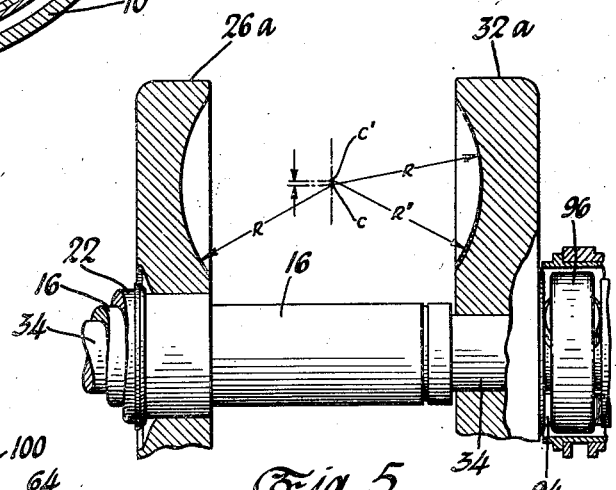
Fig. 5 is a diagram showing in section a pair of races including that one which is acted on directly by the torque loading device.

In order to avoid overloading the races and rollers under the described conditions owing to the inability of the automatic take-up torque loading device to slacken, retreat, or "back-up" from any advanced adjustment imparted by the spring to the gag element 98, the raceway curvature of race 32a, upon which the torque loading device acts directly, is given a modified curvature, as shown in Fig. 5. As an example, this view shows at C the center of curvature of the raceway of the driving race 26a in an axial plane, and R the radius of curvature of this raceway. C' indicates the center of curvature of the raceway of the driven race 32a, in a radial plane, and R' the radius of curvature. The difference in curvature of the raceway of race 32a with respect to the raceway of race 26a and the other races is too slight to be apparent in Fig. 1, it is, therefore, exaggerated in Fig. 5. In a double toric transmission mechanism as illustrated in Fig. 1, if the pitch diameter of the circumference including center C be taken as 5.500" the pitch diameter of circumference of adjusted center C' would be 5.504"; and if the radius R be taken as 2.500", radius R' should be 2.479". The effect of the modified curvature of the raceway of race 32a, is to compensate for the differences of elastic deflection in an axial direction of the totality of the transmission elements due to different angular positions of the rollers, by maintaining the axial position of the cam carrying roller at the radii of contact of the torque loading rollers substantially the same under a given load throughout all ratio changes.

We claim:

1. In friction race and roller transmission mechanism, a torque loading device unyielding abutment means to receive the reaction force thereof, an adjustable gag element arranged to transmit the reaction force of the torque loading device to the abutment means, and means for exerting a continuous yielding force upon the gag element to cause it to take up and fill the space between the abutment means and torque loading device and thereby maintain the loading device in position to impart the greatest amplitude of axial movement for which it was designed.

2. In friction race and roller transmission mechanism, a torque loading device composed of relatively adjustable elements, adjusting means, axially unyieldable to the reaction of the torque loading device, arranged to fix the relative positions of said elements so as to be capable of imparting a greater or lesser amplitude of axial motion, and a means exerting a constant yielding force on said adjusting means to cause it to take up slack in the torque loading device and thereby maintain the elements of the torque loading device in condition to impart the greatest amplitude of axial movement for which it was designed.

3. In friction race and roller transmission mechanism, a torque loading device comprising axially spaced elements and interposed means for causing axial separation of said elements in response to a relative rotary movement, unyielding abutment means to receive the reaction force thereof, means for adjusting one of said elements axially toward and from the other, consisting of an adjustable gag operatively disposed between said axially adjustable element and said abutment means and arranged to bear against said axially adjustable element and means exerting a yielding force on said gag, said gag tending to take up and fill the space between the abutment means and said adjustable element, and said adjusting means thereby tending to move said axially adjustable element toward its companion.

4. In friction race and roller transmission mechanism, a torque loading device comprising cooperating coaxial cam elements capable of relative motion about the axis, one of said cams being adjustable axially, a gag comprising a threaded nut bearing against said axially adjustable cam, and a spring biased to rotate said nut in a direction to move said axially adjustable cam toward its companion.

5. In friction transmission mechanism comprising coaxial driving and driven races and a coaxial shaft, one of said races having a lost motion driving connection with the shaft, torque loading means comprising cooperating cam elements rotatable respectively with said shaft and with said race having a lost motion driving connection with the shaft, means for axially adjusting the cam element driven by the shaft, comprising a nut threaded on the shaft, a spiral spring having one end anchored to the shaft and its other end anchored to the nut, and biased to rotate the nut in a direction to move the cam element driven by the shaft toward its companion.

6. Friction race and roller transmission mechanism, including a torque loading device, a gag element, means for exerting continuous yielding force upon the gag element to maintain the loading device in position to impart the greatest amplitude of axial movement for which it was designed; a pair of coaxial races having opposed toroidal raceways, one of said races being directly acted on by the torque loading device and capable of movement toward the other race of the pair and of limited angular movement to render the torque loading device effective; said last named race having a race the radius of curvature of which in an axial plane is slightly less than the radius of curvature of the opposed raceway, and the center of curvature of which is slightly farther from the race axis than the center of curvature of the opposed raceway.

WINFIELD D. GOVE.
JOHN DOLZA.